United States Patent
Reed et al.

(10) Patent No.: US 6,397,209 B1
(45) Date of Patent: May 28, 2002

(54) REAL TIME STRUCTURED SUMMARY SEARCH ENGINE

(75) Inventors: Jim Reed, Kanata; Paul Streatch, Richmond, both of (CA)

(73) Assignee: Telexis Corporation, Kanata (CA)

( * ) Notice: Subject to any disclaimer, the term of this patent is extended or adjusted under 35 U.S.C. 154(b) by 0 days.

(21) Appl. No.: 09/242,909

(22) PCT Filed: Aug. 29, 1997

(86) PCT No.: PCT/CA97/00611

§ 371 (c)(1),
(2), (4) Date: Sep. 14, 1999

(87) PCT Pub. No.: WO98/09229

PCT Pub. Date: Mar. 5, 1998

(30) Foreign Application Priority Data

Aug. 30, 1996 (CA) .............................................. 2184518

(51) Int. Cl.⁷ .............................................. G06F 17/30
(52) U.S. Cl. ........................... 707/3; 707/100; 707/101; 707/102
(58) Field of Search .............................. 707/100, 3, 4, 707/5, 101, 102, 10, 2

(56) References Cited

U.S. PATENT DOCUMENTS

| | | | | |
|---|---|---|---|---|
| 5,050,071 A | * | 9/1991 | Harris et al. .................... 707/3 |
| 5,191,525 A | * | 3/1993 | LeBrun et al. .................. 707/3 |
| 5,257,365 A | * | 10/1993 | Powers et al. ............... 707/103 |
| 5,519,855 A | * | 5/1996 | Neeman et al. ............... 707/100 |
| 5,710,844 A | * | 1/1998 | Capps et al. ..................... 707/3 |
| 5,818,955 A | * | 10/1998 | Smithies et al. ............. 382/115 |
| 5,845,278 A | * | 12/1998 | Kirsch et al. ................... 707/3 |
| 6,009,442 A | * | 12/1999 | Chen et al. .................. 707/522 |
| 6,122,643 A | * | 9/2000 | Paik et al. ................... 707/104 |
| 6,182,066 B1 | * | 1/2001 | Marques ........................ 707/5 |

FOREIGN PATENT DOCUMENTS

WO 9623265 * 8/1996 ........... G06F/17/30

* cited by examiner

Primary Examiner—Frantz Coby
(74) Attorney, Agent, or Firm—Marks & Clerk

(57) ABSTRACT

A method of organizing electronic documents for storage and subsequent retrieval, involves storing a summary structure describing the structure of summary records associated with each document. Each structured summary record has at least one descriptor field representative of a characteristic of the document. Predefined field entries identify a characteristic of the document. Predefined keyword criteria associated with the field entries are stored. Each document is analyzed to build a text index listing the occurrence of unique significant words in the document. The text index is compared with the keyword criteria to determine the appropriate field entry for the document. For example, one descriptor field might related to topic, which could have the field entries of "financial" or "sports". The preponderance of certain keyword criteria, such as "money" or "shares" would identify the document with the financial topic.

15 Claims, 2 Drawing Sheets

REAL TIME STRUCTURED SUMMARY SEARCH ENGINE

FIELD OF THE INVENTION

This invention relates to a method of processing data, and more particularly to a method of processing stored electronic documents to facilitate subsequent retrieval.

BACKGROUND OF THE INVENTION

It is known to search text-based documents electronically using keywords linked through Boolean logic. This technique has been used for many years to search patent literature, for example, and more recently documents on the Internet. The problem with such conventional searches is that if the search criteria are made broad, the search engine will often produce thousands of "hits", many of which are of no interest to the searcher. If the criteria are made too narrow, there is a risk that relevant documents will be missed.

There is a real need to provide a search engine that will filter out unwanted results while retaining results of interest to the user. An object of the invention is to provide such a system.

SUMMARY OF THE INVENTION

According to the present invention there is provided a method of processing electronic documents for subsequent retrieval, comprising the steps of storing in memory a summary structure database describing the structure of summary records associated with each document, each structured summary record having at least one descriptor field with predefined allowed entries identifying a characteristic of the document; storing in memory predefined keyword criteria associated with said allowed field entries; analyzing each document to build a text index listing the occurrence of unique significant words in the document; and comparing said text index with said keyword criteria to determine the appropriate field entry for the associated descriptor field.

Examples of descriptor fields with limited allowed field entries are category and location. The category field might have as possible field entries: Finance, Sports, Politics. The location field might have as possible entries: Africa, Canada, Europe.

The individual field entries are in turn associated with certain keyword criteria. For example, the criteria for the financial field entry. might be: shares, public, bankrupt, market, profit, investor, stock, IPO, quarter, "fund manager". The criteria for the sports field entry might be: football, ball, basketball, hockey, bat, score, soccer, run, baseball, "Wayne Gretsky", "Chicago Bulls", "Michael Jordan".

It will be appreciated that the keyword criteria are chosen in view of the likelihood that any document containing those keywords will be associated with the particular category.

In a preferred embodiment, the structured summary also includes fields having unlimited entries. Examples of such fields are a keyword field and an excerpt field. The keyword field may list the words having the highest count in the text index. The excerpt field may list the sentences containing the highest occurrence of keywords.

The structured summary can be established according to a standard profile that is the same for all users, or in one embodiment the profile can change in accordance with a particular user's need. In this case, a user profile is stored in a profile database.

The structured summaries normally include pointers to the memory locations of the associated documents so that during a subsequent search, a user view relevant summaries and quickly locate the associated document as required.

The invention also extends to a system for processing electronic documents for subsequent retrieval, comprising a memory storing a summary structure describing the structure of summary records associated with each document, each structured summary record having at least one descriptor field with predefined allowed entries identifying a characteristic of the document; a memory storing predetermined keyword criteria associated with said allowed field entries; means for analyzing each document to build a text index listing the occurrence of unique significant words in the document; and means for comparing said text index with said keyword criteria to determine the appropriate field entry for the associated descriptor field.

The invention still further provides a method of retrieving electronic documents which are associated with a structured summary record containing a pointer to the document and having at least one descriptor field representative with predefined allowed field entries identifying a characteristic of the document, comprising searching through the summary records for records having specific field entries, and identifying the documents associated with the records matching the search criteria.

BRIEF DESCRIPTION OF THE DRAWINGS

The invention will now be described in more detail, by way of example, only with reference to the accompanying drawings, in which.

DETAILED DESCRIPTION OF THE INVENTION

Figure 1:
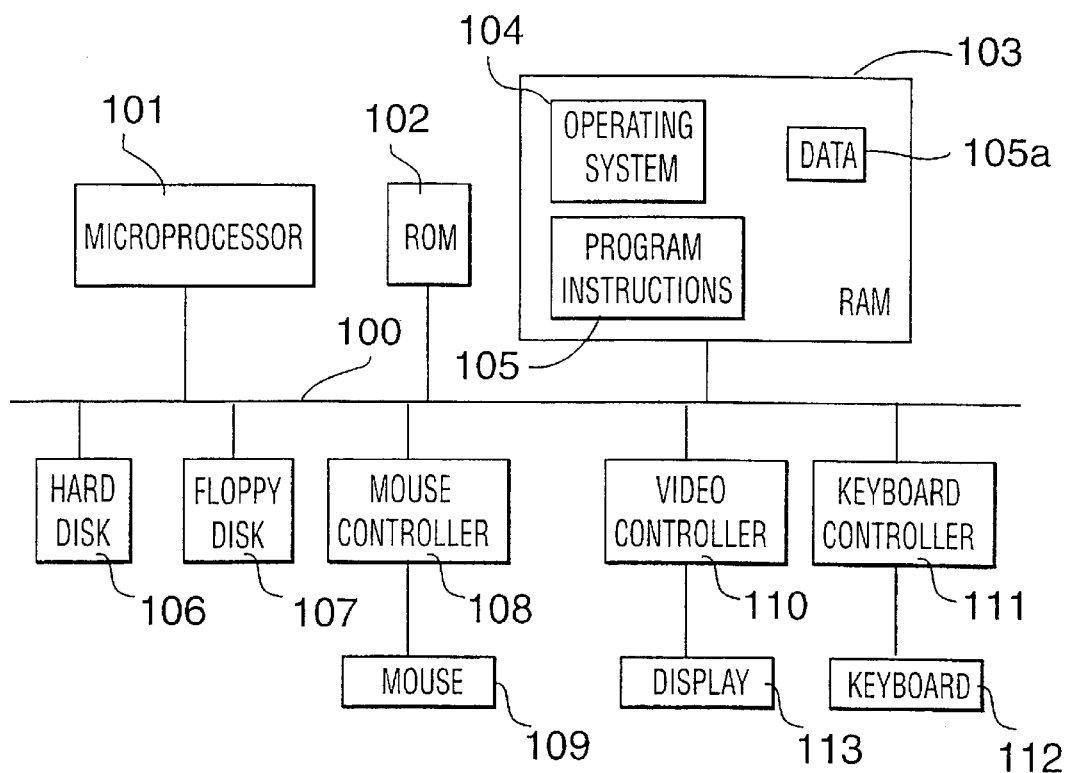
FIG. 1 is a block diagram of a computer system suitable for implementing the present invention.

The following table is an example of a structured summary record associated with a particular document, in this case an article on the Internet search engine, Yahoo. The record has two limited descriptor fields, category and location, having, for example, the allowed field entries, finance, sports, and politics for category, and Africa, Canada, and Europe for location, and two fields, keywords and excerpts, having unlimited field entries.

| STRUCTURED SUMMARY | |
| --- | --- |
| Descriptor Field | Field Entry |
| Category | Financial |
| Location | Canada |
| Keywords | Yahoo, Internet, Search, Software |
| Excerpts | Shares in the maker of Internet search software are tumbling. Yahoo stock (YHOO/NASDAQ) is down 38% from April's first-day trading high of US$33 as investors pull out on fears of increasing competition and lack of proprietary technology. |

In this example, the entry for the descriptor field called category is financial and the entry for the descriptor field called location is Canada. The unlimited fields contain keywords and key sentences, i.e. sentences containing the highest occurrence of keywords.

The structured summary records for a series of documents are stored in a database, for example, on a computer hard disk as a series of such records, each having a pointer to the location in memory of the associated document that it summarizes. When a user wishes to perform a search, he or she can search through the structured summaries, for example, for the keyword Yahoo, looking only for those records that have the field entry financial for category.

Each allowed field entry contains a pointer to another entry in a database of summary candidates. Each record in this database identifies the keyword criteria associated with each field entry of the structured summary record. Each candidate has a name corresponding to a field entry of the structured summary record. The table below illustrates a summary candidate database. The first record has a candidate name financial, which is one of the entries for the field name category in the structured summary. The candidate financial lists the keywords that identify a documents as belonging to the category financial.

SUMMARY CANDIDATE DATABASE

| Descriptor Field Name | Candidate name | Keyword Criteria |
| --- | --- | --- |
| Category | Financial | shares, public, bankrupt, market, profit, investor, stock, IPO, quarter, "fund manager |
| Category | Sports | football, ball, basketball, hockey, bat, score, soccer, run, baseball, "Wayne Gretsky", "Chicago Bulls", "Michael Jordan". |
| Location | Canada | Canada, Toronto, Ottawa, Vancouver, Halifax etc. |
| Location | Asia | Asia, Far East, Japan, Tokyo, Korea, etc. |
| Location | Europe | Europe, London, Paris, Germany etc. |

A plurality of summary structures can be stored in the summary structure database in accordance with the user profile and each such structure is given a unique name to identify the particular user or class of users.

The invention is implemented on a general purpose computer, such as an IBM-compatible Pentium-based personal computer, although more powerful computers can be employed to increase storage capacity and decrease search time. The summary candidate database and the structured summaries can be stored on a hard disk.

In order to implement the invention, a computer as shown in FIG. 1 is loaded with instructions to implement the described method. The computer typically comprises a main bus 100 connected to a microprocessor 101, a Read-Only-Memory 102 and a Random Access Memory 103 containing the operating system 104, program instructions 105 implementing the present invention, and data 105a.

Typically connected to the bus 100 are a hard disk 106, which stores the database information, a floppy disk 107, a mouse controller 108 connected to mouse 109, a video controller 110 connected to display 113, and a keyboard controller 111 connected to a keyboard 112.

Figure 2:
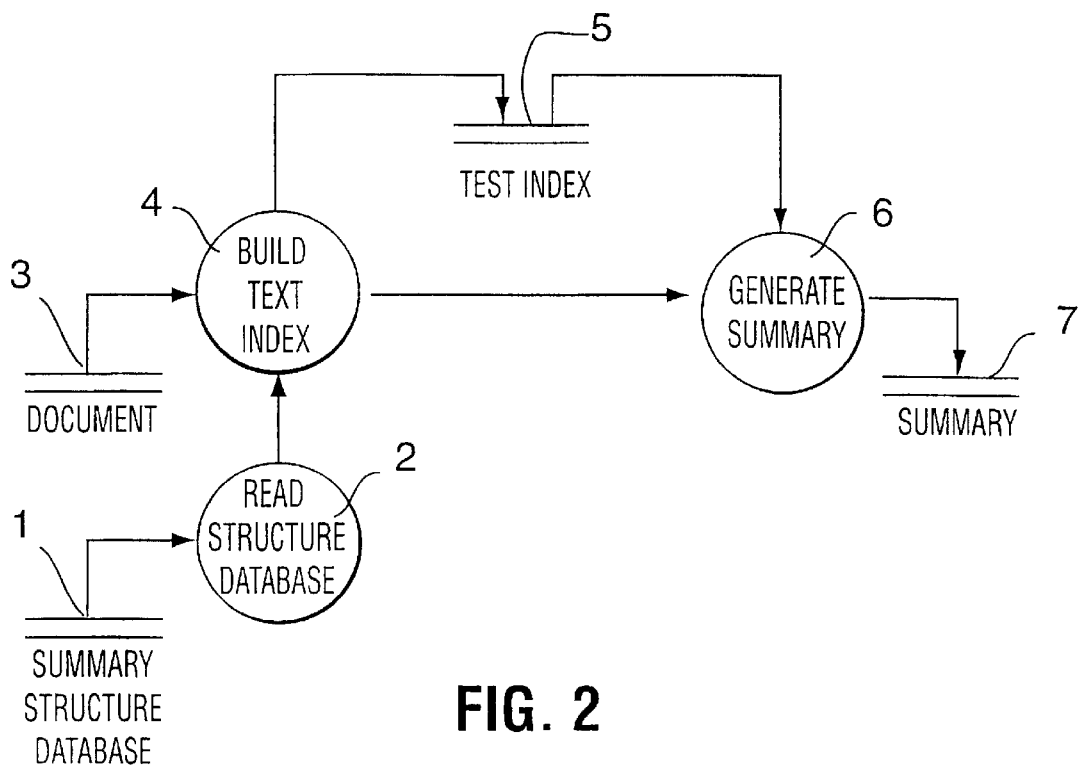
FIG. 2 is data flow diagram for a method in accordance with the invention.

As shown in FIG. 2, the computer first reads the structured summary database 1 stored on hard disk 106 to extract the summary structure 2. This can be made user dependent, or alternatively can be the same for all users. The summary structure record contains the field structure of the summary records to be created. The system then extracts the next electronic document from a document database 3 and builds 4 a text index 5, which is temporarily stored in memory. This consists of an index of all significant words in the document, i.e. excluding "noise words", such as "or", "and", "the" etc. and ranks them according to word count.

The computer then generates a at step 6, structured summary 7 which is stored in memory 103.

Figure 3:
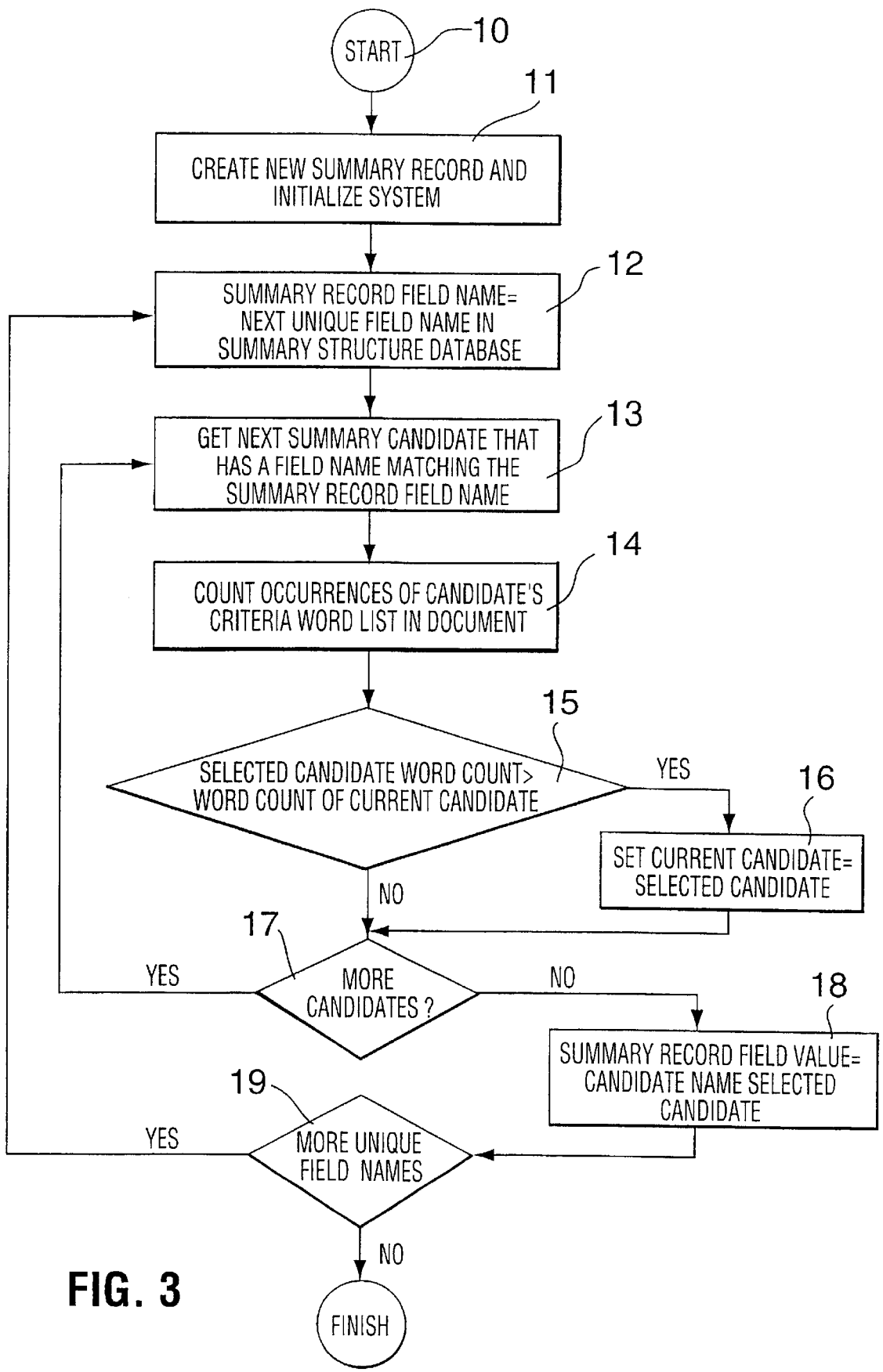
FIG. 3 is a flow chart illustrating the operation of a part of the method in accordance with the invention.

A detailed flow chart illustrating the generation of each summary record is shown in FIG. 3. At the start 10, the system creates a new summary record 11 associated with a new document extracted from the document database. The new record has a field structure defined in the field structure database and includes a pointer to the memory location of the associated document. During operation of the loop, the system keeps track in memory of the name of a "current candidate" and its word count (to be described). At block 11, the system is also initialized to set the current candidate and corresponding word count to none.

At step 12, the system sets the summary record field name to the next unique field name in the summary structure database starting from the first, and at 13 retrieves from the summary candidate database the next summary candidate (selected candidate) also starting from the first having a field name matching the summary record field name that has just been set. For example, the first summary record field name might be "category". The first summary candidate with a field name category might be "financial" having the criteria keywords noted above.

Next, the number of occurrences of each word on the criteria word list in the current document for the selected candidate (financial) is determined at 14 and these occurrences are totaled to give the word count for the selected candidate. Decision unit 15 determines whether the total word count for the selected candidate is greater than the word count for the current candidate. If the answer is yes, the current candidate is set to the selected candidate. Clearly, on the first pass, the current candidate will be set to the selected candidate unless none of the criteria keywords appear in the document.

Decision unit 17 determines whether there are any more candidate records in the candidate database, and if so the loop is repeated for the next candidate. Decision unit 15 determines whether the candidate word count is greater than the word current of the current candidate, and if so unit 16 sets the new selected candidate to the current candidate. Otherwise the loop is repeated until there are no more candidates, whereupon the summary field entry of the structured summary is set to the name of the current candidate at unit 18.

The larger loop is repeated 19 until there are no more field names. The net result is that the structured summary contains a series of field names which have entries corresponding to the names of the summary candidates whose word count is the highest for the corresponding field name, unless of course none of the keywords for any of the entries of a particular field name appear in the target document, in which case the field entry will remain blank.

In a preferred implementation, when the summary structure database is first read, an index is built that maps the words contained in the criteria word lists to summary candidates. With this arrangement, it is easy to determine a sub-set of summary candidates that are applicable to the current document. By counting only the words in the summary candidates that are applicable, summaries using a large summary database (>100,000 criteria words) can be quickly generated. The use of a large summary database is the key to generating accurate summaries.

A similar loop determines the keywords having the highest count, for example, the first four, and enters these into the keyword field. Another loop determines the sentences, for example, containing the keywords having the highest count, for example, the first four sentences with the highest occurrence of keywords.

The described real-time structured summary system provides a technology can be used as the basis for developing, a number of sophisticated search features that will help the user filter out unrelated results and focus on the results that are of interest.

The real power of having, a structured summary is observed when a user summarizes a set of related documents, rather than just a single document (e.g., a set of clips accesTV™ Assistant, or a set of documents returned from an Internet Search Server. For example, a search for documents on Michael Jordan would return a hit from many documents of little interest to the user. If the results of the search are summarized, then the user can easily ignore stories that have, for example, the field category with an entry other than sports.

Typically, a news story is re-broadcast many times throughout to day. Duplicate stories can be filtered out by comparing the summaries of recorded stories. If the summaries are the same, then there is a good chance that the documents are the same. This results in opening many fewer documents for comparison, which can be more efficient than the alternative.

It is also possible to use the system to look for similar documents. Predetermined criteria indicative of a degree of similarity can be set. For example, documents can be regarded as similar if there is a 90% match of keywords. In a search, the system can be asked to generate all summaries where there is a match of 90% or greater.

The system can be used with e-mail articles or news stories.

In another situation, consider the case of an Internet Search that has returned 3000 results, and a user has found a document that is of interest to than. The user can be presented with a short list of similar documents (hopefully much smaller than the 3000) using an application that looks for summaries (in the set of 3000 documents) that are similar to (have several fields in common) the summary of the document of interest.

An extension to determining similar documents, is an ignore feature. A user may be interested in monitoring stories on the Canadian Government, but not interested in continually receiving updates of Sheila Copps resigning. This feature can be implemented in the same manner as looking for similar documents, by looking for summaries that are similar to the summary of the document that is to be ignored.

Another feature allows a user to take a document that they may have received by e-mail, or downloaded from the Internet, and convert it to a search that can be used to monitor an accesTV Assistant source (e.g., Television channel). or that can be executed by an Internet Search Server. This feature can be implemented easily using summary technology. One possible implementation would be to monitor the summaries rather than the source, and look for similar summaries.

By adding a priority weight to summary items, it becomes very easy to prioritize results based on the user's individual interests Results containing summary items with a higher weight will be given precedence over results with a lower weight.

By adding hierarchy information to summary items, a more sophisticated summary engine can be implemented.

For example, a user might specify that a field type sub-category is dependent on a field type category, and that a particular sub-category named "basketball" is only applicable is the selected category is "sports". This way user can have a category hierarchy that results in a very accurate summary.

This embodiment could be applied to an automatic classification system for patent searching. Keywords most likely associated with particular classes and subclasses would need to be identified, and then the system would create structured summaries based on the highest occurrence of keywords. The system would enable documents to be retrieved electronically even though the entered keyword was not present in the document. For example, if the user was interested in a document relating to a microprocessor, but which did not actually use that term, the structured summary would contain the word microprocessor as a field entry based on the fact that the document contained a high incidence of terms such as "program", "instruction", "processor" commonly associated with the term microprocessor.

The summary structures can also include a ranking field which keeps count of the number of relevant keywords, and this can be used to rank search results in order of importance.

What is claimed is:

1. A method of processing electronic documents for subsequent retrieval, comprising the steps of:

storing in memory a summary structure database describing the structure of summary records associated with each document, each structured summary record having at least one descriptor field with predefined allowed field entries identifying A characteristic of the document;

for the or each said descriptor field storing in memory respective groups of predefined criteria keywords associated with each of said allowed field entries;

analyzing each document to build a text index listing the occurrence of unique significant words in the document; and matching said text index with said predefined criteria keywords to determine the appropriate corresponding field entry for the associated descriptor field in accordance with predetermined criteria.

2. A method as claimed in claim 1, wherein the appropriate field entry is selected from the allowed field entries by taking the allowed field entry whose associated group of predefined criteria keywords contains a word with the highest word count in the document.

3. A method as claimed in claim 2, wherein a series of candidate entries corresponding to the field entries of each descriptor field of the summary records are stored in memory, and said candidate entries are examined on an iterative basis to determine the entry having the predefined criteria keywords that correspond to the highest word count in the document.

4. A method as claimed in claim 3, further comprising building an index that maps the criteria keywords to the summary candidates so as to permit the sub-set of candidates applicable to a document to be rapidly determined.

5. A method as claimed in claim 1, wherein said summary structure includes additional fields having unlimited entries.

6. A method as claimed in claim 5, wherein one said additional field comprises a keyword field listing the words in said text index having the highest count.

7. A method as claimed in claim 5, wherein another said additional field comprises an excerpt field listing the sentences in said document containing the words in said text index with the highest count.

8. A method as claimed in claim 1, wherein structured summaries are compared to determine whether two documents have the same content.

9. A method as claimed in claim 1, wherein structured summaries are compared to determined whether two documents have similar content based on a predetermined match of field entries in the documents.

10. A method as claimed in claim 1, wherein said descriptor fields with predefined allowed entries have at least one sub-field arranged in a hierarchical structure.

11. A method as claimed in claim 1, wherein said documents comprises news articles.

12. A method as claimed in claim 11, wherein said news articles are extracted from television broadcasts.

13. A method as claimed in claim 1, wherein said structured summary records also include a ranking field containing a keyword count to permit search hits to be ranked in order of importance.

14. A method as claimed in any one of claim 1, wherein each summary record contains a pointer to the location of the associated document.

15. A system for processing electronic documents for subsequent retrieval, comprising:

a memory storing a summary structure describing the structure of summary records associated with each document, each structured summary record having at least one descriptor field with predefined allowed field entries identifying a characteristic of the document;

a memory storing, for the or each said descriptor field, groups of predetermined criteria keywords associated with each of said respective allowed field entries;

means for analyzing each document to build a text index listing the occurrence of unique significant words in the document; and means for matching said text index with said criteria keywords to determine the appropriate field entry for the associated descriptor field in accordance with predetermined criteria.

* * * * *